(12) United States Patent
Deininger (10) Patent No.: US 7,389,628 B2
(45) Date of Patent: Jun. 24, 2008

(54) METHOD FOR CHANGING ROLLS OF TUBULAR FILM

(76) Inventor: Karl Deininger, Brahmsgasse 1, A-8680 Mürzzuschlag (AT)

( * ) Notice: Subject to any disclaimer, the term of this patent is extended or adjusted under 35 U.S.C. 154(b) by 12 days.

(21) Appl. No.: 10/578,009

(22) PCT Filed: Nov. 4, 2004

(86) PCT No.: PCT/AT2004/000388

§ 371 (c)(1),
(2), (4) Date: Oct. 10, 2006

(87) PCT Pub. No.: WO2005/042348

PCT Pub. Date: May 12, 2005

(65) Prior Publication Data

US 2007/0079923 A1    Apr. 12, 2007

(30) Foreign Application Priority Data

Nov. 4, 2003 (AT) ............................ A 1748/2003
Jul. 22, 2004 (AT) ............................ A 1251/2004

(51) Int. Cl.
*B65B 9/10* (2006.01)
(52) U.S. Cl. ............................ 53/459; 53/469; 242/553; 242/554.2
(58) Field of Classification Search ........................ None
See application file for complete search history.

(56) References Cited

U.S. PATENT DOCUMENTS

| | | | | |
|---|---|---|---|---|
| 2,689,095 A | * | 9/1954 | McWhorter | 242/421.7 |
| 3,687,787 A | * | 8/1972 | Grand, III | 156/507 |
| 3,769,136 A | * | 10/1973 | Ospelt | 156/157 |
| 4,490,199 A | | 12/1984 | Dunning | |
| 5,679,207 A | | 10/1997 | Palone et al. | |
| 7,005,021 B2 | * | 2/2006 | Kramer | 156/73.4 |
| 2006/0254697 A1 | * | 11/2006 | Futase | 156/157 |

FOREIGN PATENT DOCUMENTS

| | | |
|---|---|---|
| DE | 195 15 718 | 11/1996 |
| DE | 102 40 644 | 3/2004 |
| EP | 1 201 585 | 5/2002 |
| EP | 1 304 214 | 4/2003 |
| JP | 1 285550 | 11/1989 |

\* cited by examiner

*Primary Examiner*—John Sipos
(74) *Attorney, Agent, or Firm*—Collard & Roe, P.C.

(57) ABSTRACT

A method for joining an initial section (3) of a film tube (2) which is wound up in a band-like manner on a reel (1) with an end section (4) of a second film tube (5) extending over subsequent processing stations, especially a packaging system, in an at least partly band-like manner, in which it is provided that at least one upwardly pivoting tab (3a, 3b, 4a, 4b) each is formed by the placement of a cut in the initial and end sections (3, 4) of the two film tubes (2, 5) to be joined, with a tab (4a, 4b) of the end section (4) being placed on a tab (3a, 3b) of the initial section (3) and the superimposed tabs (3a, 3b, 4a, 4b) are mutually joined in a tension-proof manner. The production of a tension-proof connection of the initial and end sections (3, 4) of the film tubes (2, 5) occurs here by welding, with welding methods on the basis of ultrasonic sound being preferred.

7 Claims, 15 Drawing Sheets

METHOD FOR CHANGING ROLLS OF TUBULAR FILM

CROSS REFERENCE TO RELATED APPLICATIONS

Applicant claims priority under 35 U.S.C. §119 of Austrian Applications No. AT 1748/2003 filed Nov. 4, 2003 and No. AT 1251/2004, filed Jul. 22, 2004. Applicant also claims priority under 35 U.S.C. §365 of PCT/AT2004/000388 filed Nov. 4, 2004. The international application under PCT article 21(2) was not published in English.

The invention relates to a method for joining an initial section of a film tube wound in a band-like manner on a reel with an end section of a second film tube, especially for packaging systems, in accordance with the preamble of claim 1 and a packaging system in accordance with the preamble of claim 8.

Film tubes are usually wound up on reels which are held in a rotatable fashion and from which the film tube is unwound and supplied to further processing steps. The film tube is also designated below as a tube roll. Film tubes are used in packaging systems in numerous ways, e.g. in bagging systems for packing goods into bags or in palletizing systems for wrapping goods held on pallets.

In bagging systems for example, the film tube is wound off from such a tube roll and filled with material in subsequent sections of the machine. For this purpose it is necessary that the film tube which is present at first in a band-like manner needs to be opened in order to enable its filling. This occurs with the help of a mandrel which is positioned in the axial direction within the film tube, so that the film tube is opened when passing the mandrel. Such a configuration is also known as a "flying mandrel" because the mandrel needs to be held in the interior of the film tube in stable fixing. As an alternative to such a flying mandrel, it is also possible to use wedges or vacuum suction devices, especially when processing bags with slit folds.

The opening of the film tube produced with the help of the mandrel is now available for filling with goods in bagging systems or for wrapping goods in palletizing systems. In the case of bagging systems, the respective film tube section is sealed on either side of the filled material with the help of special welding methods for example, and the packaged goods can be removed.

There is a special problem concerning the exchange of the reel when the film tube wound on the reel is completely used up. In a conventional manner, the packaging system is stopped, the reel of the consumed tube roll is removed and a new tube roll is made available instead. The initial section of the new tube roll is then inserted manually in a positioning and tensioning station downstream of the tube roll and is supplied to the next following sections within the system. In particular, the mandrel or wedge is manually inserted into the initial section of the new tube roll. The packaging system can only be started again when the mandrel or wedge has been inserted.

The change of a reel thus leads to longer standstill periods of the entire system. Notice must be taken that tube rolls usually comprise approximately 1200 bags. The processing speed of bagging systems is close to approximately 1800 bags per hour however. A tube roll is thus used up in approximately 40 minutes. The change of the tube roll takes about 10 to 20 minutes. The bagging system is thus at a standstill up to a third of its operating period during operation. Increasing processing speeds for film tubes lead to an increasing deterioration of the ratio between working time and standstill time of the system.

Therefore, it has been proposed not to wind up the film tubes on reels at the producer's side but to provide special containers in which the band-like packaging material is hold in a folded manner so that the second end of the band-like packaging material rests at least over some time and is accessible from the outside of the container during the first end is fed into the packaging system. This makes it possible to work with the second end and especially to join it with an end section of a band-like packaging material of a successive, second container during the feed of the first end. Thus, after the packaging material has been completely used up in the first container, withdrawal from the second container is automatically started. Already during start up of the packaging system two ends of packaging material which are located in two successive containers may be joined with each other so that depending on the number of available containers an arbitrary supply of packaging material can be provided without the need for stopping the packaging system.

For the folded storage of the band-like packaging material different possibilities have been proposed, e.g., in form of a pile in which two planes of the pile of the packaging material being each adjacent to a folding axis are lying basically horizontally upon each other. In this case, the first end of the band-like packaging material may be adjacent to the upmost plane of the pile, and the second end of the band-like packaging material may be adjacent to the bottom plane of the pile, so that starting with the end of the packaging material which is fed to the processing system the material is taken from the upper areas of the pile. The end which is at last fed to the processing system may, e.g., be pulled from the bottom along a side wall of the container to the area of the uppermost plane of the pile from where it may project over the upper bounds of the container. Alternatively, an opening may be provided in the bottom area of the container for taking out the second end section. These measures are only feasible in cases where the band-like packaging material is indeed provided in a folded manner.

EP 1 201 585 A1, therefore, proposes to cut the initial section of a new tube roll in a trapezoid manner, to place the tab thus formed over the end section of an old tube roll, which end section has not been cut in any way, and to join the two sections. Since, according to EP 1 201 585 A1, the end section of the old tube roll is not cut in a trapezoid manner for the formation of swivelable tabs, the formation of a tension-proof connection, e.g., by welding, can only occur, if a support is provided inside the downstream film tube. This support, however, must be held in place inside the downstream film tube for which purpose guiding rolls are provided in EP 1 201 585 A1. A setting of this kind where a support permanently guided by guiding rolls is provided inside the film tube, however, has at least two significant disadvantages. First, in particular the guiding rolls inside the downstream film tube need lubrication, so that application of a method according to EP 1 201 585 A1 is questionable for, e.g., bagging systems for food or feed. Secondly, a method according to EP 1 201 585 A1 considerably limits the speed of the film band, since the heat transfer to the support guided inside the downstream film tube would otherwise be too big. In particular, the plasticity limit of plastics usually used for film tubes would be reached locally, so that, e.g., during a stop of the film undesired weldings between the support or its guiding rolls and the film would be inevitable.

It is therefore the object of the present invention to avoid longer standstill periods of the entire system during a change of the tube roll. It is a particular object that after the joining of the old with the new film tube a tube is produced again whose opening cross section at the joining point is not reduced or reduced only marginally. This goal is achieved by the characterizing features of claim 1 and claim 8.

Claim 1 provides for joining an initial section of a film tube which is wound up in a band-like manner on a reel with an end section of a second film tube extending over subsequent processing stations, especially a packaging system, in an at least partly band-like manner, that in the initial and end sections of the two film tubes to be joined a tab is formed by the placement of a cut, which tab can be flipped upwardly and the tabs of the initial and end sections are placed above one another and are joined in a tension-proof manner with each other. This ensures that the film tube of the consumed tube roll forms an approximately continuous film tube with the new tube roll, which film tube extends over the entire system. For this purpose it is not necessary that the joining section forms a tight tube section because the joining section need not necessarily be used for the filling. It must offer a tension-proof connection however so that the two joined film tubes can be smoothly guided through the further sections of the system and especially the mandrel can be transferred from the old film tube to the new film tube. In particular, the method in accordance with the invention ensures that after the joining of the two film tubes a tube is produced again whose opening cross section is not reduced at the joining point or reduced to only a marginal extent.

For the production of such a tension-proof connection it is provided in accordance with claim 1 that at least one swivelable tab is formed at the initial and end section by placing a cut. The placement of such a cut can occur in different ways. In accordance with claim 2, the two initial and end sections to be joined can each be cut off at first transversally to the longitudinal extension of the film tubes in order to thereafter cut off the arising corner regions of the initial and end sections at an acute angle relative to the longitudinal extension of the film tubes, so that two tabs each are produced on the initial and end sections to be joined, which tabs taper at the end side. As can be seen directly, these tabs can be swiveled upwardly, with the tapering at the end side promoting the handling of the tabs. It can be provided in particular in accordance with claim 3 that the placement of the cut occurs transversally to the longitudinal extension of the film tubes at a right angle to the longitudinal extension, so that the tabs taper in a trapezoid manner at the initial and end sections of the two film tubes.

It is provided according to claim 4 that the tension-proof connection of the initial and end sections of the film tubes is formed by welding. Welding methods on the basis of ultrasonic sound have proven to be advantageous in this respect.

The tabs produced on the initial and end sections need to be lifted from the film tubes, held in position and swiveled back again. It has proven to be advantageous in accordance with claim 6 that the tabs of the initial and end sections of the film tubes to be joined are sucked up by means of negative pressure and are pivoted.

As was already mentioned, welding methods are preferably used for producing a tension-proof connection. An advantageous work process is defined in claim 7, according to which a tab of the initial section is placed on a welding anvil for welding the initial and end sections of the film tubes and is sucked up by the same by means of negative pressure, and a tab of the end section is placed on the tab situated on the welding anvil and is welded together with the same.

Claim 8 relates to a bagging system with a reel on which a film tube is would up, a positioning and tensioning station which unwinds the film tube from the reel and supplies the same to the subsequent plant sections, a packaging unit for processing a film tube section and a conveying device for removing packaged goods. It is provided in accordance with the invention that at least one cutting apparatus for cutting the film tube and a welding station for processing the film tube is arranged between the positioning and tensioning station and the packaging unit. The cutting apparatus is used for placing the cut according to claim 1 and the welding station for providing a tension-proof connection. It concerns an ultrasonic welding system in accordance with claim 9. Pivoting suction means are further provided between the positioning and tensioning station and the filling station, which suction means are used for pivoting the tabs at the initial and end section.

The invention is explained in closer detail by reference to the enclosed drawings, wherein.

Figure 1A:
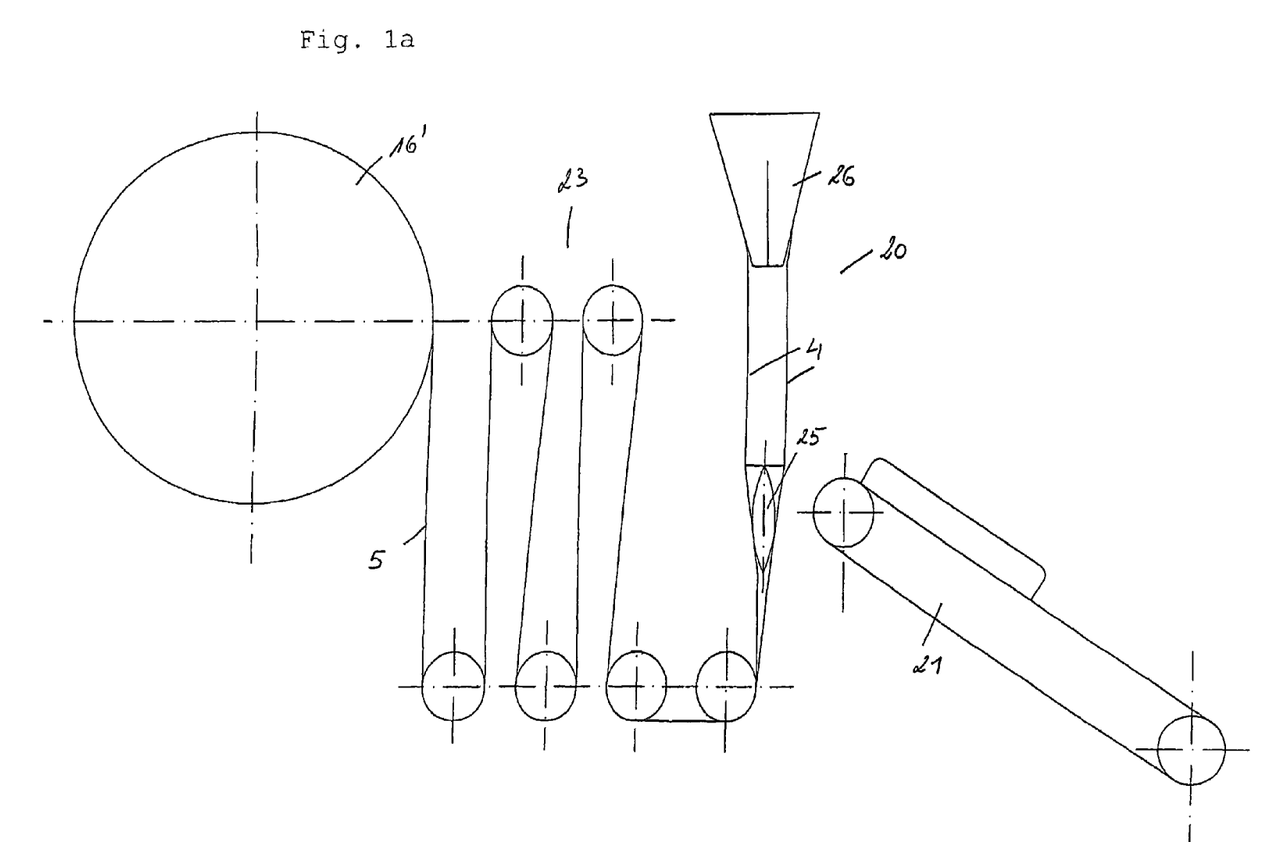
FIG. 1*a* shows a schematic representation of a packaging system with a flying mandrel according to the state of the art.
Figure 1B:
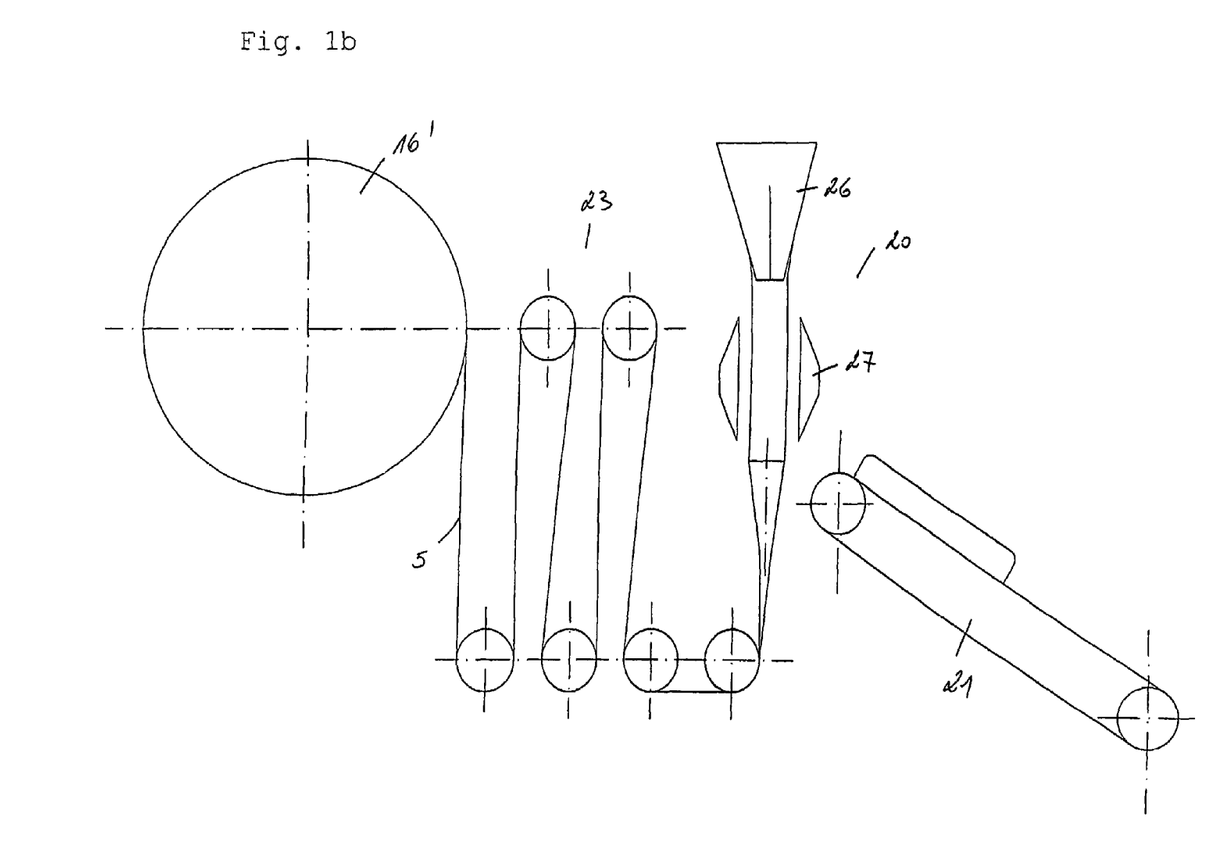
FIG. 1*b* shows a schematic representation of a packaging system with vacuum suction means according to the state of the art.
Figure 1C:
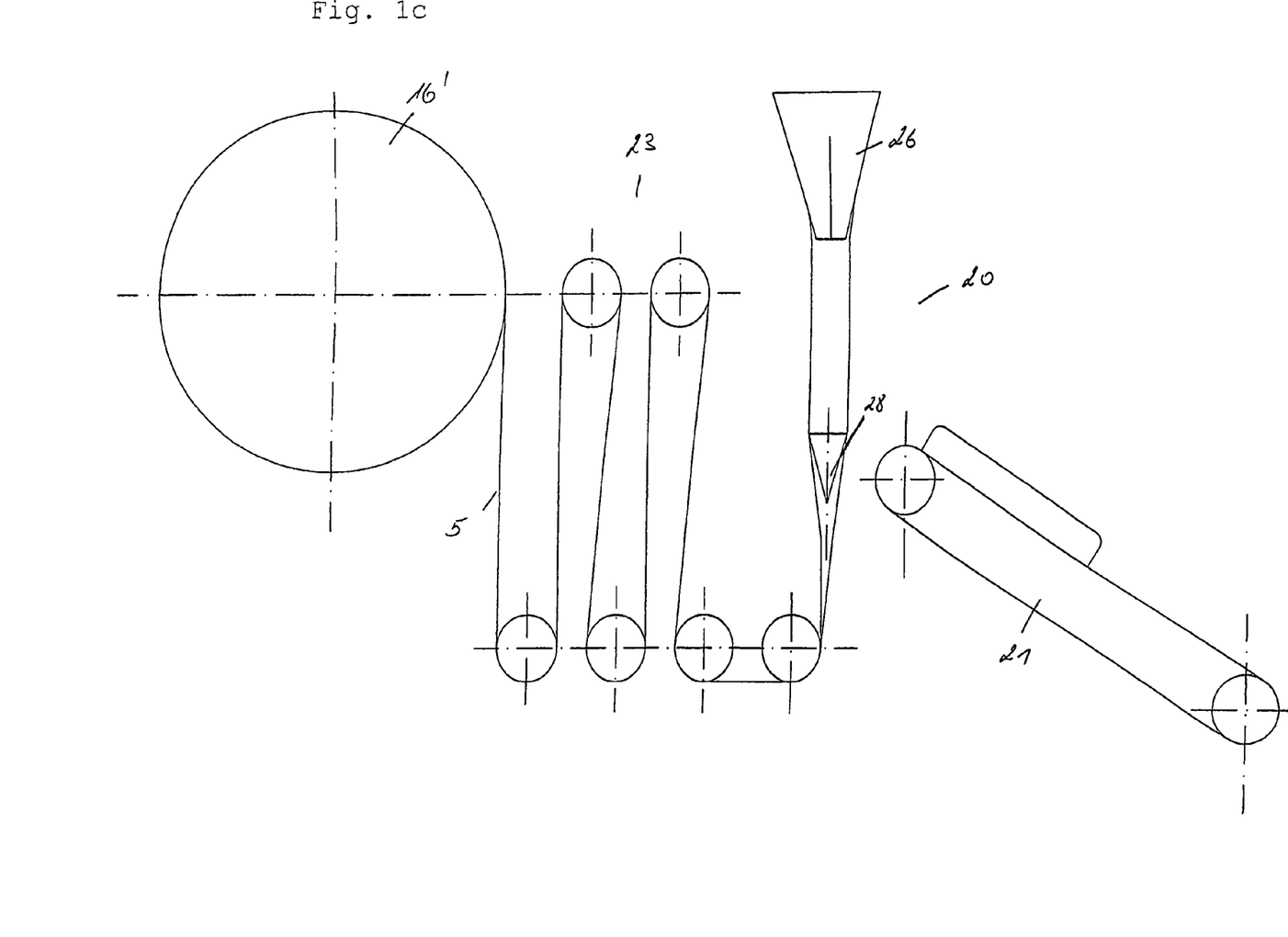
FIG. 1*c* shows a schematic representation of a packaging system with a lateral wedge according to the state of the art.

FIGS. 1a through 1c show a schematic representation of a conventional bagging unit with a tube roll 16', a tensioning and buffering unit 23, a filling or packaging unit 22 and a conveyor 21. Prior to filling it is necessary in the filling or packaging unit 22 to open the film tube 5, which is ensured with the help of a mandrel 25 inserted into the film tube 5. The film tube 5 can now be filled via a filling funnel 26 for example. The film tube 5 is cut off at either side of the filled section and the ends are welded together. The packaged goods can now be removed by the conveyor 21. The working steps in such systems proceed in an automated fashion and are controlled by plant control systems.

FIG. 1b shows a further embodiment of a conventional bagging system, in which vacuum suction means 31 are used for opening the film tube 5 instead of the mandrel 25. This is especially recommendable when using slit gusseted bags. FIG. 1c schematically shows the use of a side wedge 28. In all these embodiments there is the problem of changing the reel when a film tube 5 wound up on reel 1 is fully used up. Conventionally, the packaging system is stopped, the reel 1 of the consumed film tube 16' is removed and instead a new film tube 16 is provided. The initial section of the new film tube 16 is then inserted manually into a tensioning and buffering unit 23 which is directly downstream of the film tube 16 and is then supplied to the further system sections. In particular, the mandrel 25 or wedge 28 is manually introduced into the initial section of the new tube roll 16. The packaging system can only be started when the mandrel 25 or wedge 28 has been inserted. This leads to longer standstill periods of the entire system.

These standstill periods can be avoided in accordance with the invention by the arrangement of a cutting apparatus 7, 8, 9 and a welding station 12, 13, as will be explained below by reference to the following FIGS. 2 to 12.

Figure 2A:
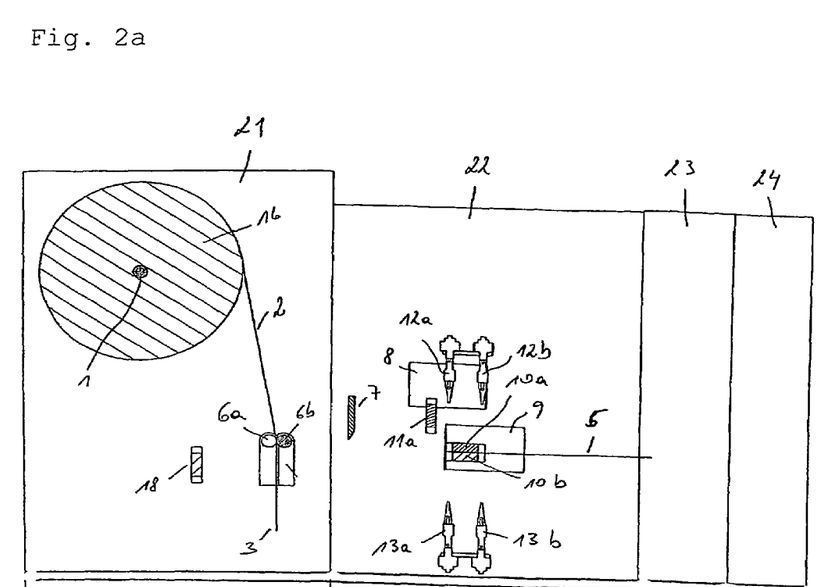
FIG. 2*a* shows a schematic representation of a packaging system in accordance with the invention with a roll hopper, cutting and welding unit, tensioning and buffering unit and the packaging unit in a process step in which the initial section of a new tube roll is inserted manually into the positioning and tensioning station of the roll hopper and the end section of the old roll is cut to size.
Figure 2B:
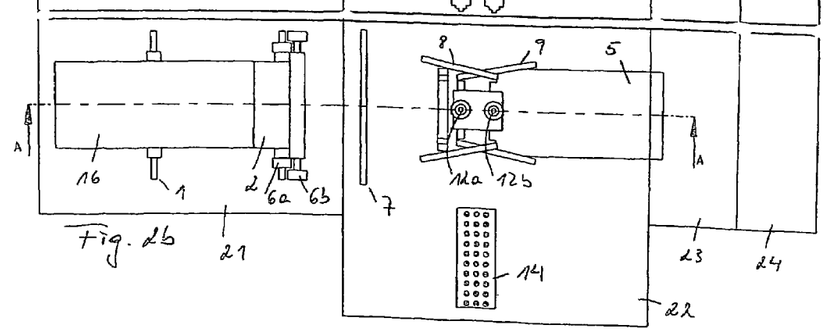
FIG. 2*b* shows the schematic representation according to FIG. 2*a* from above.

FIG. 2 schematically shows at first an overview of the entire system with the new film tube 2 which is wound up in a band-like manner on the new tube roll 16, and with cutting apparatuses 7, 8, 9, the welding station 12, 13, buffering unit 23 and the packaging unit 24. The filling or packaging unit 24 may concern a filling unit of a bagging system or a packaging unit for wrapping up pallets with the help of a film tube 5. In contrast to conventional systems according to FIGS. 1a through 1c, cutting units 7, 8, 9 and a welding station 12, 13 are provided in accordance with the invention between the tensioning and positioning unit 6a, 6b of the roll hopper 21 and the buffering unit 23.

Figure 13A:
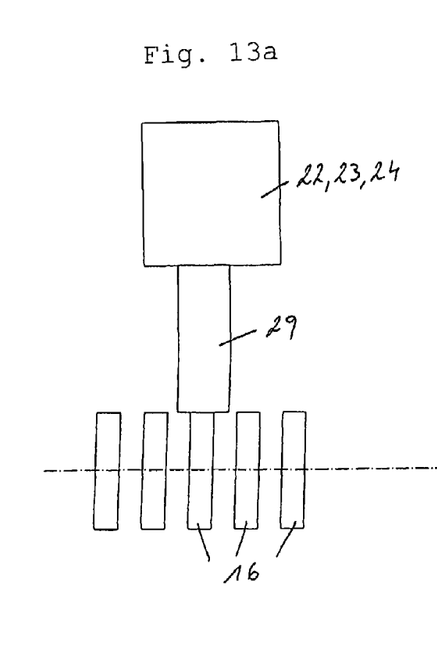
FIGS. 13a to c show different embodiments of a roll hopper.
Figure 13B:
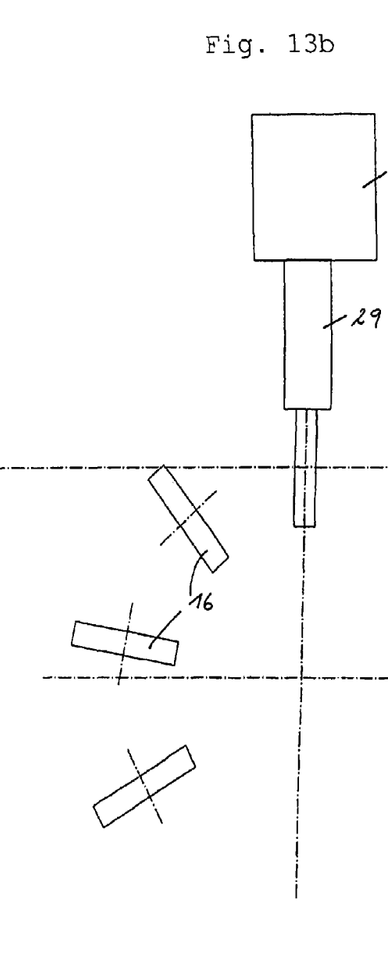
Figure 13C:
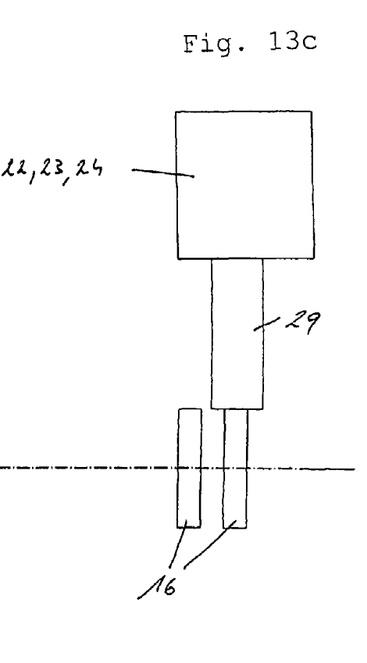

The new film tube 16 is supplied by a roll hopper 21 for which different embodiments are possible. FIG. 13a shows a linear roll hopper where the tube rolls 16 are aligned in a coaxial manner and are successively supplied to a changer 29. The changer 29 removes a tube roll 16 from the linear roll hopper and positions it relative to the remaining sections 22, 23, 24 of the system, so that the initial section 3 of the new film tube 16 can be supplied to the other sections 22, 23, 24 of the system. According to an alternative embodiment of a roll magazine as shown in FIG. 13b, it is also possible to provide a rotary roll hopper where the tube rolls 16 are provided with a circular arrangement. Moreover, a continuous lift is also possible in accordance with FIG. 13c, so that the tube rolls 16 can also be moved in a perpendicular direction relative to an image plane of FIG. 13c.

The initial section 3 of the new film tube 2 of a new tube roll 16 is positioned and fixed in the feeding device of the changer 29 in such a way that the initial section 3 is suspended in a defined position. It is well protected against disturbing electromagnetic influences. The initial section 3 is then grasped by the tensioning roller 6a and feed rollers 6b (FIG. 2).

The end section 4 of the old film tube 5 is grasped on either side in a pneumatic way with the help of the pivoting suction means 10a, 10b during this working step and is positioned on a first cutting apparatus 9 where the end section 4 is cut to size. The cutting process is chosen in such a way that at least one upwardly pivoting tab 4a, 4b is produced on the end section 4. A preferred placement of the cut is such that the end section 4 is cut off at first transversally to the longitudinal extension L of the film tube 5, preferably at a right angle, along a line of a cutting line $Q_1$ (also see FIG. 6). This cutting process is especially recommended for misshaped end sections 4. Thereafter, the corner regions 15 thus produced are cut off at an acute angle relative to the longitudinal extension L of the film tube 5 along the cutting lines $S_1$, and $S_2$, so that an upper tab 4a and a lower tab 4b are produced which each taper at the end side. It can now be clearly seen that the acute angle relative to the longitudinal extension L needs to open in the direction of the film tube 5 because otherwise no upwardly pivoting tabs 4a, 4b can be formed. On the other hand, the cutting line $Q_1$ can also be omitted if the cutting lines $S_1$ and $S_2$ are chosen in such a way that their point of intersection comes to lie within the film tube 5.

As an alternative to this the film tube 5 can also be slit open in a merely axial way at its initial section 4, which would also lead to upwardly pivoting tabs 4a, 4b. Different placements of cuts could be advantageous depending on the requirements and the respective processing circumstances.

Figure 3A:
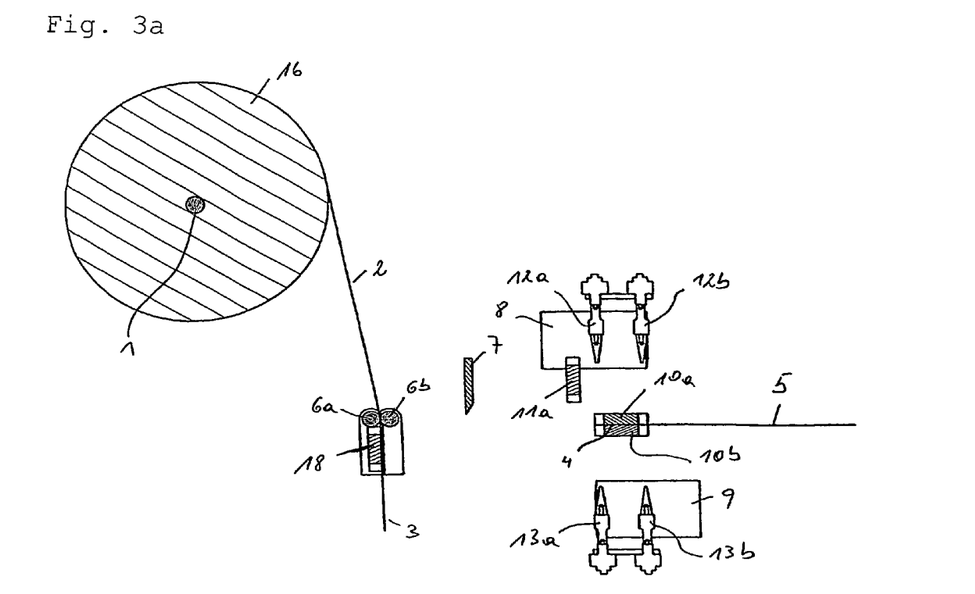
FIG. 3*a* shows a schematic representation according to FIG. 2 for the process step in which the initial section of the new roll is grasped in the positioning and tensioning station by a pivoting suction means.
Figure 3B:
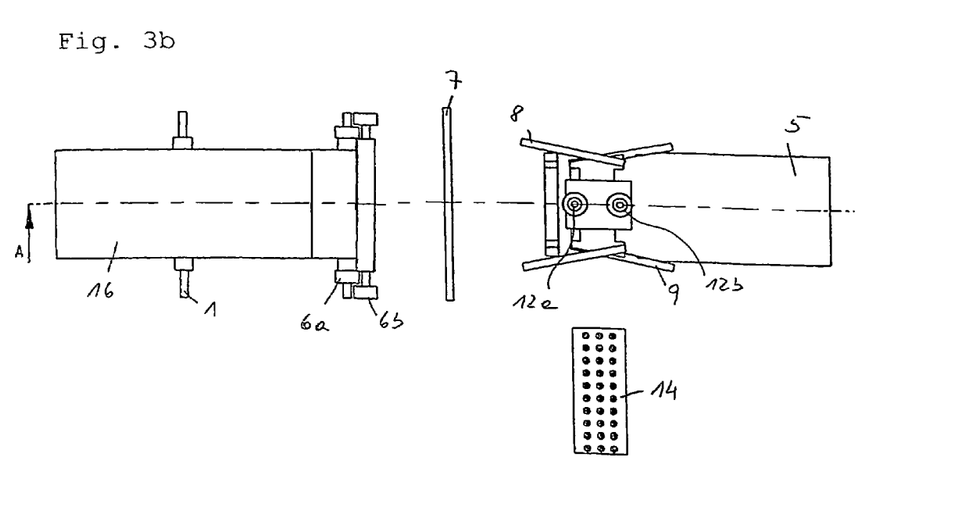
FIG. 3*b* shows the schematic representation according to FIG. 3*a* from above.

FIG. 3 shows a further processing step in which the initial section 3 of the new film tube 2 is grasped pneumatically by a pivoting suction means 18 and is pressed with the help of the tension roller 6a against the feed roller 6b. The cutting apparatus 9 is further pivoted away, with the tabs 4a, 4b of the end section 4 being held in a defined position.

Figure 4A:
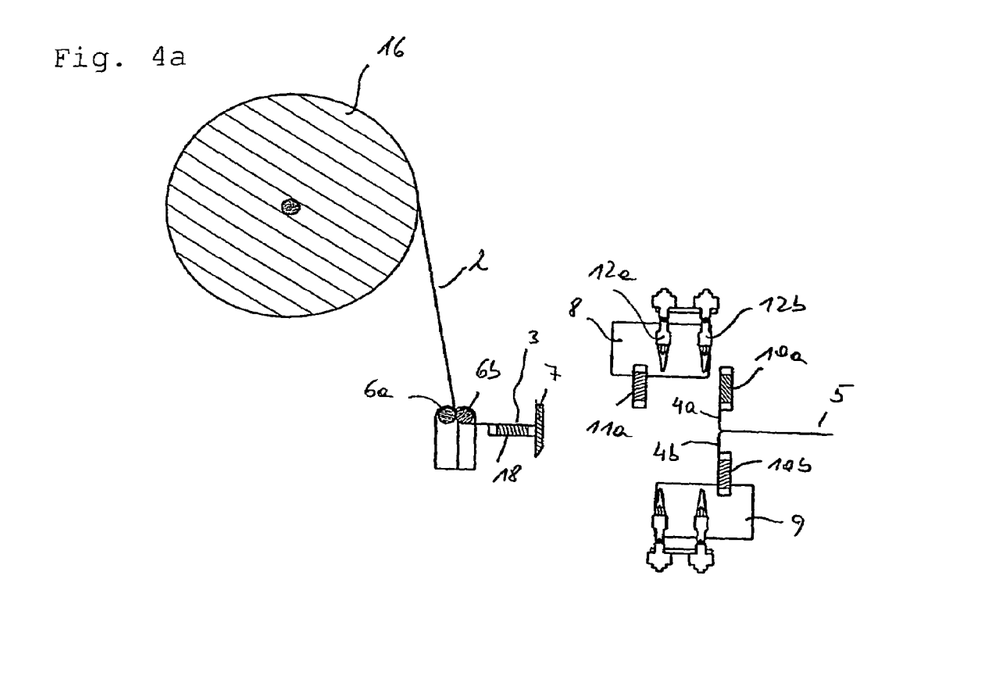
FIG. 4*a* shows a schematic representation of FIG. 2 for the process step in which the tabs of the end section of the old roll are flipped upwardly.
Figure 4B:
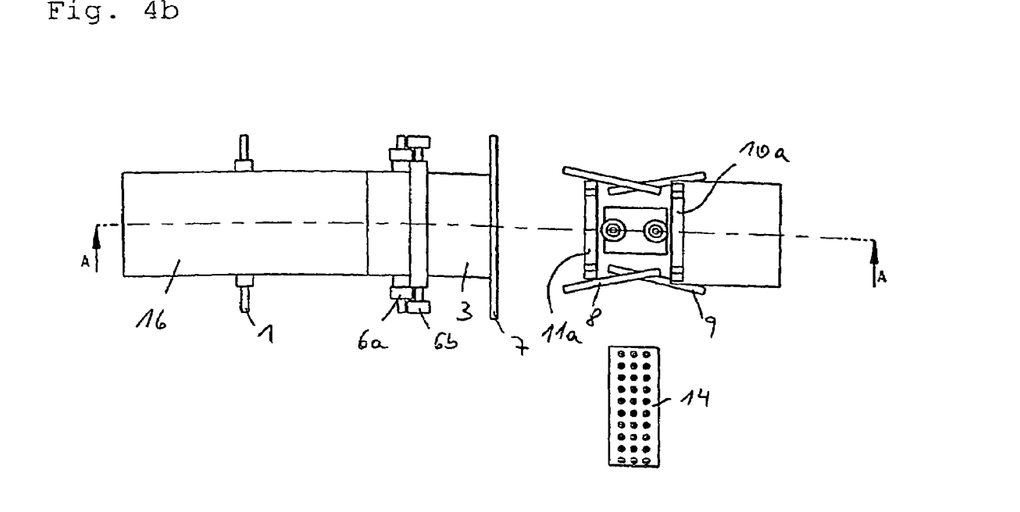
FIG. 4*b* shows the schematic representation according to FIG. 4*a* from above.
Figure 6:
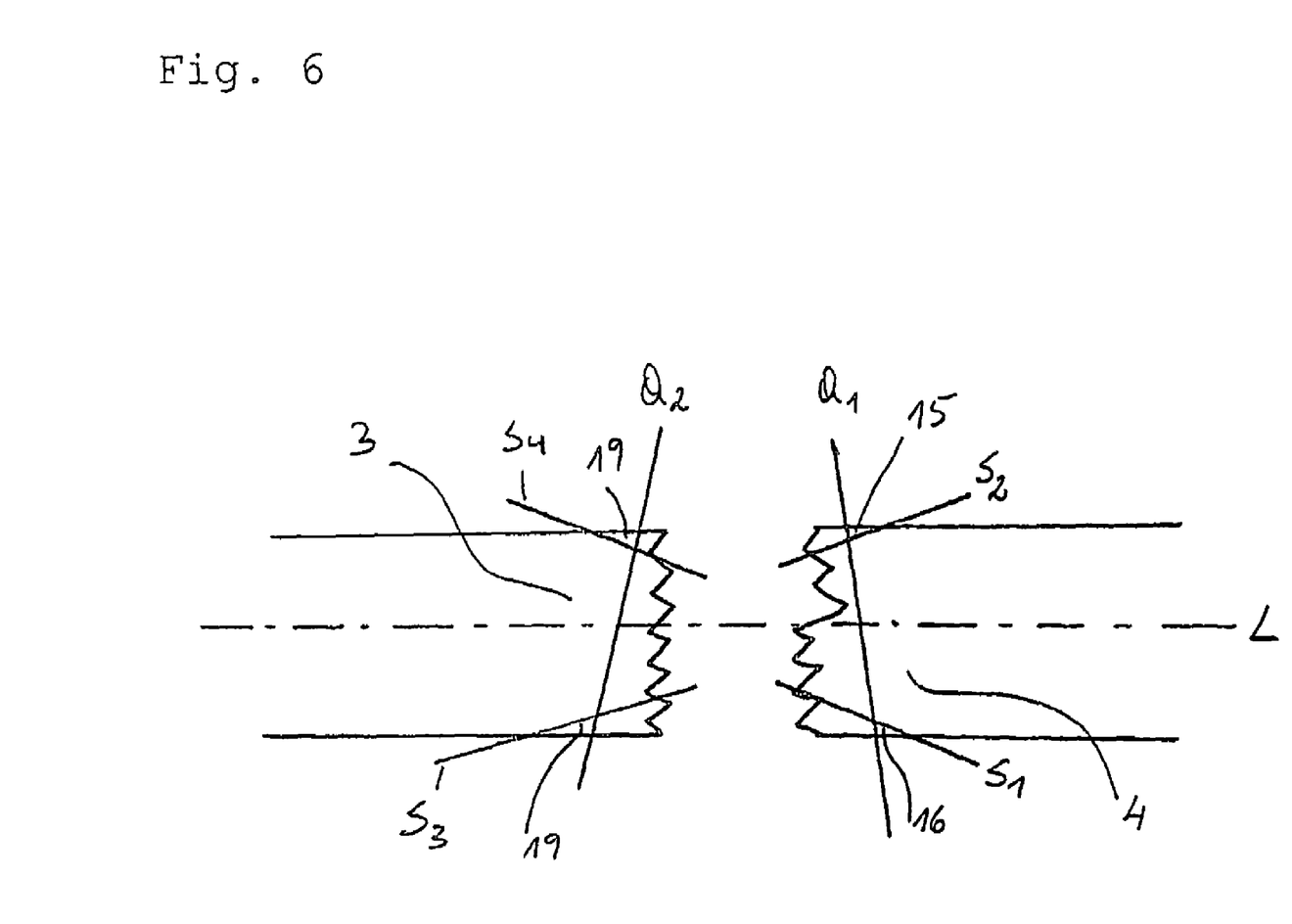
FIG. 6 shows a schematic representation from above of the initial and end section of the two film tubes to be joined, which shows a possible placement of a cut.

FIG. 4 shows how thereupon the initial section 3 is supplied with the help of the pivoting suction means 18 of the cutting apparatus 7 where the initial section 3 is cut off transversally to the longitudinal extension L of the film tube 2, preferably at a right angle, along the cutting line $Q_2$ (also see FIG. 6). This cutting process is especially recommended for misshaped end sections 4, with the corner regions 19 being formed (FIG. 6). The tabs 4a and 4b of the end section 4 of the old film tube 5 are pivoted upwardly in the meantime with the help of the pivoting suction means 10a and 10b.

Figure 5A:
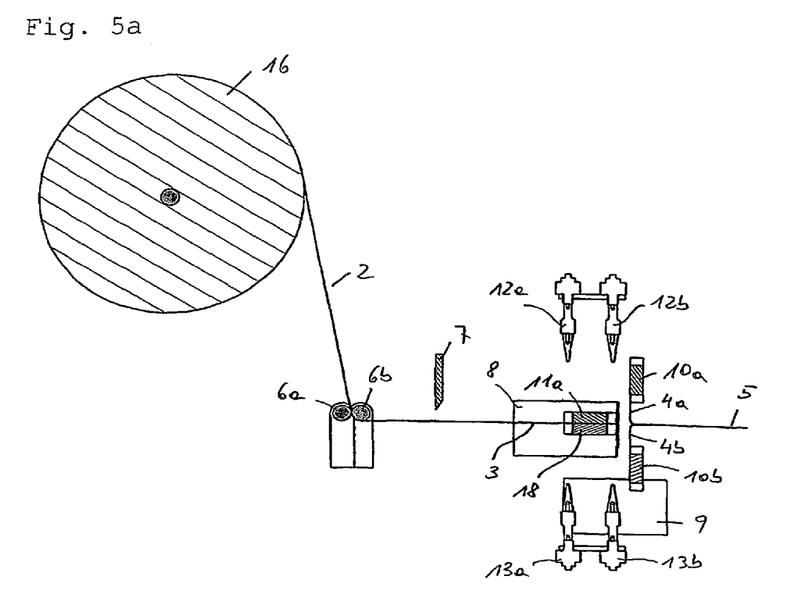
FIG. 5*a* shows a schematic representation according to FIG. 2 for the process step in which the initial section of the new roll is cut to size.
Figure 5B:
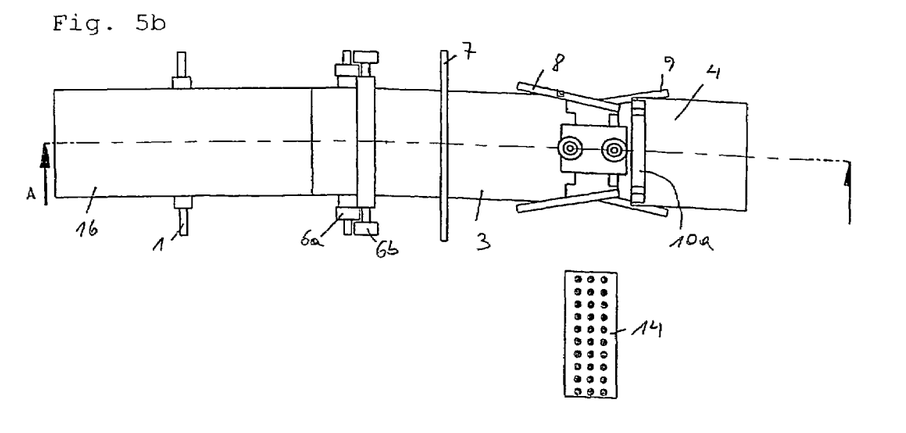
FIG. 5*b* shows the schematic representation according to FIG. 5*a* from above.

The initial section 3 of the new film tube 2 is supplied to the cutting apparatus 8 in accordance with FIG. 5, with the cutting process again being chosen in such a way that at least one upwardly pivoting tab 3a, 3b is produced at the initial section. A preferred placement of the cut is such that the corner regions 19 are cut off at an acute angle relative to the longitudinal extension L of the film tube 2 along the cutting lines $S_3$ and $S_4$, so that an upper tab 3a and a lower tab 3b are produced which each taper on the end side. It can now be seen directly that the acute angle must open relative to the longitudinal extension L in the direction towards the film tube 2 as other no upwardly pivoting tabs 3a, 3b can be formed. On the other hand, the cutting line $Q_2$ can also be omitted if the cutting lines $S_3$ and $S_4$ are chosen in such a way that their point of intersection comes to lie within the film tube 2.

Figure 7A:
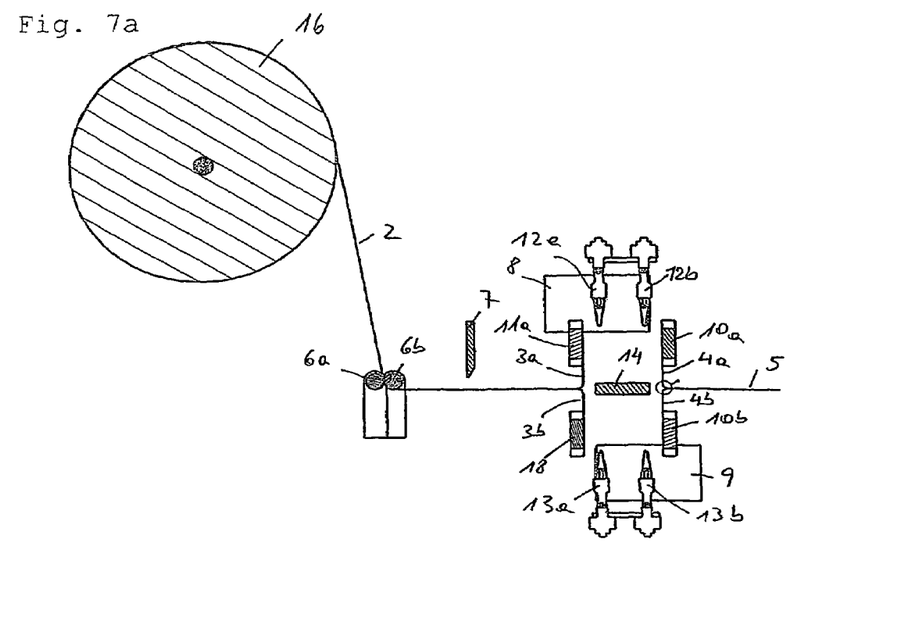
FIG. 7*a* shows a schematic representation according to FIG. 2 for the process step in which the tabs of the initial section of the new roll are flipped upwardly and the welding anvil is inserted.
Figure 7B:
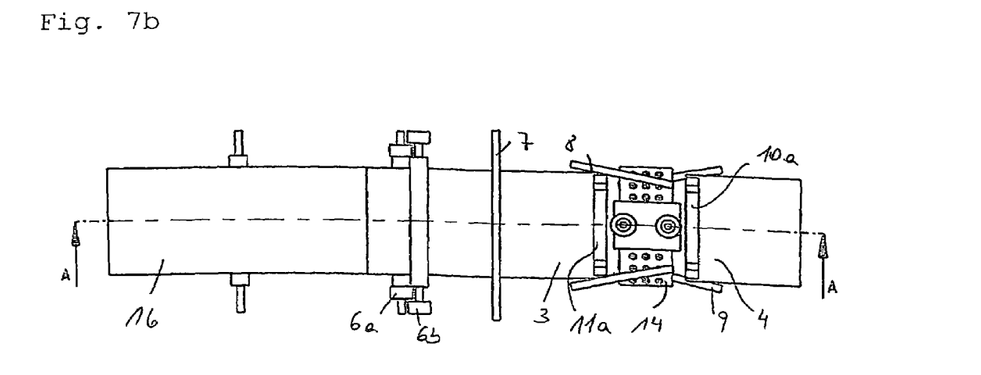
FIG. 7*b* shows the schematic representation according to FIG. 7*a* from above.

In accordance with FIG. 7, the tabs 3a and 3b of the film tube 2 can be flipped upwardly with the help of the pivoting suction means 11a and 18. In this positioning of the tabs 4a, 4b, 3a and 3b, the welding anvil 14 can be inserted laterally in order to enable the following welding of the two film tubes 2 and 5.

Figure 8A:
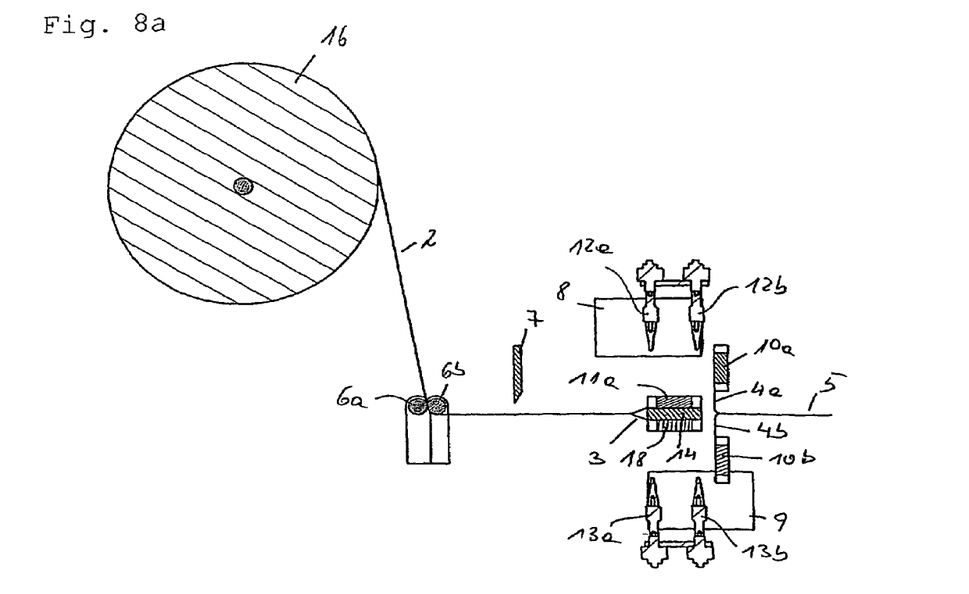
FIG. 8*a* shows a schematic representation according to FIG. 2 for the process step in which the tabs of the initial section of the new roll are placed on the welding anvil.
Figure 8B:
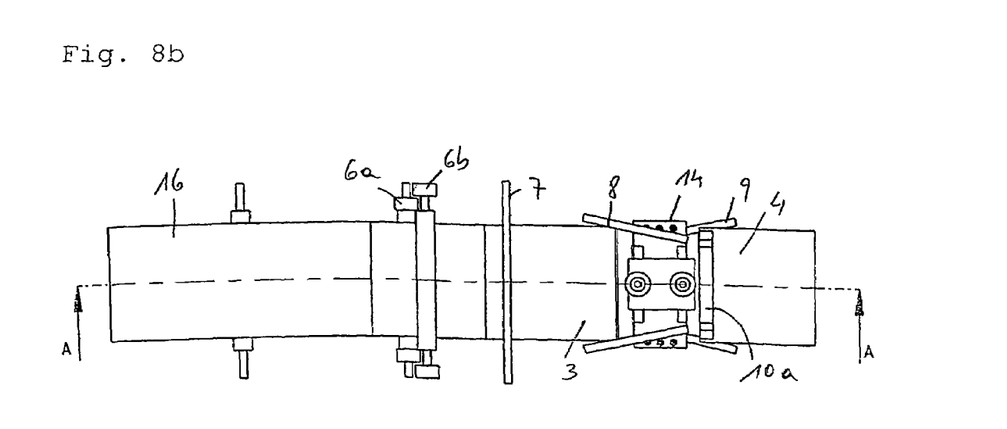
FIG. 8*b* shows the schematic representation according to FIG. 8*a* from above.
Figure 9A:
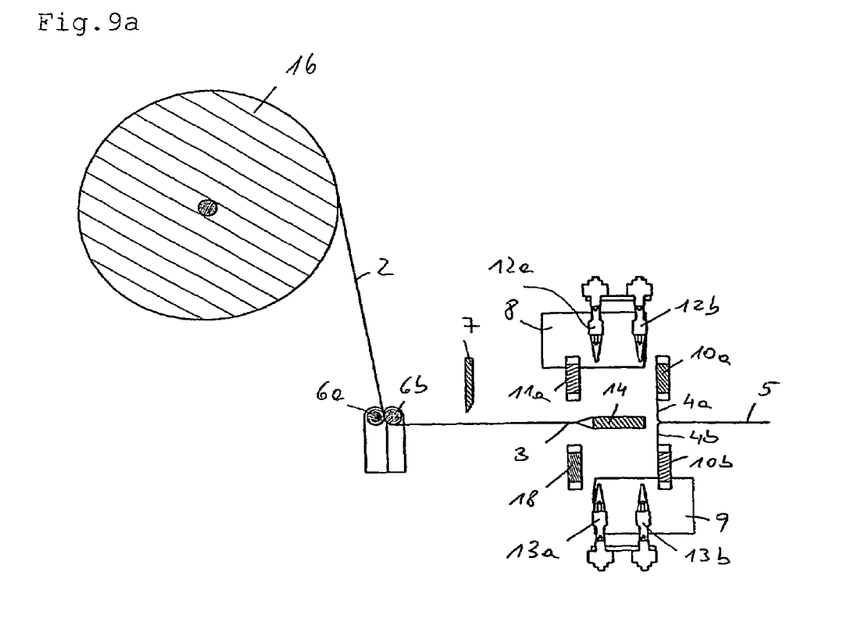
FIG. 9*a* shows a schematic representation according to FIG. 2 for the process step in which the suction means provided for handling the tabs of the initial section of the new roll are pivoted away.
Figure 9B:
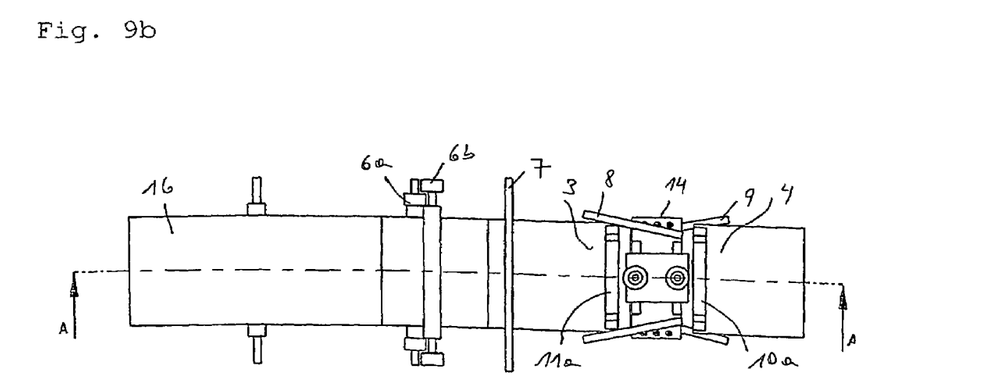
FIG. 9b shows the schematic representation according to FIG. 9a from above.
Figure 10A:
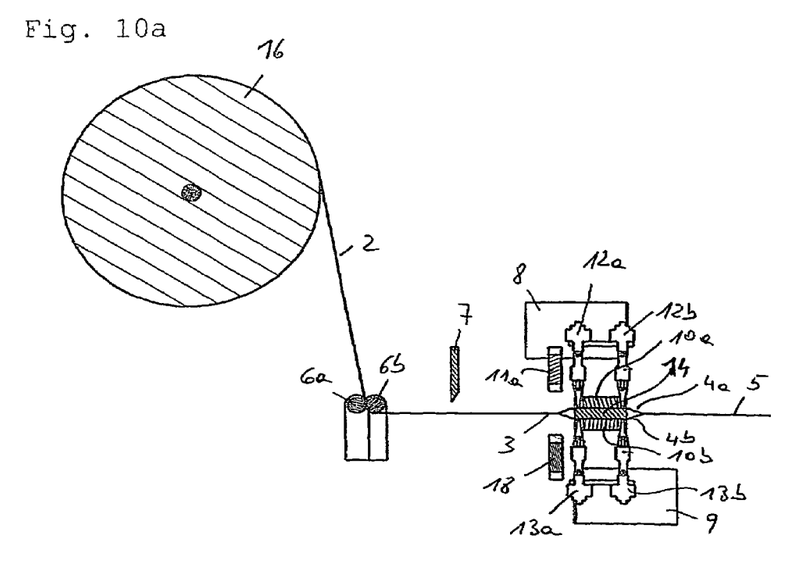
FIG. 10a shows a schematic representation according to FIG. 2 for the process step in which the tabs of the end section of the old roll are placed onto the tabs of the initial section of the new roll and are welded together with the same.
Figure 10B:
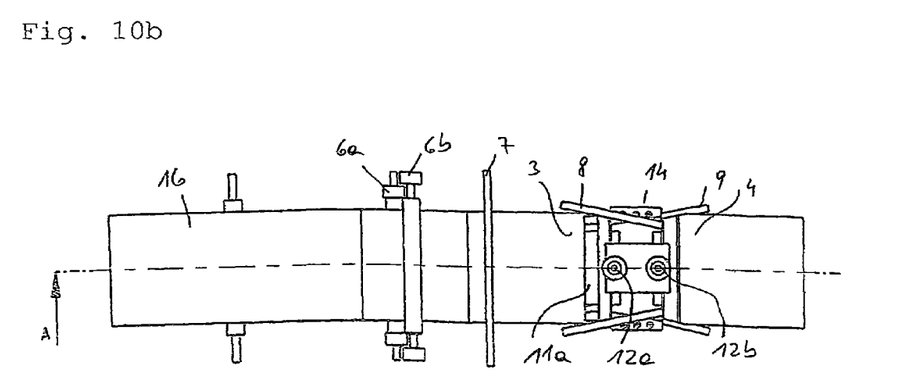
FIG. 10b shows the schematic representation according to FIG. 10a from above.

As is shown in FIG. 8, the tabs 3a and 3b are placed on the welding anvil 14 with the help of the pivoting suction means 18 and are grasped by the same pneumatically. According to FIG. 9, the pivoting suction means 11a and 18 can subsequently be pivoted away. In accordance with FIG. 10, the tabs 4a and 4b of the end section 4 of the old film tube 5 can now be placed on the tabs 3a and 3b of the initial section 3 of the new film tube 2 with the help of the pivoting suction means 10a and 10b. The welding tool 12, 13 can be moved in this positioning of the tabs 3a, 3b, 4a and 4b on the welding anvil 14 in the direction towards the film tubes 2 and 5. This preferably concerns a welding appliance based on ultrasonic sound, with the welding tools 12a, 12b as well as 13a and 13b also being known as sonotrodes. These sonotrodes 12a, 12b, 13a, 13b are placed with pressure on the tabs 3a, 3b, 4a, 4b which are made to vibrate with the help of ultrasonic sound. The input power of the ultrasonic welding appliance is chosen especially depending on the film thickness and the film quality in order to avoid problems with cooling and conglutinations. A relative movement between the tabs 3a and 4a or the tabs 3b and 4 is obtained in the contact regions, which movement leads to the generation of heat and subsequently to plastifying, i.e. the melting down of the plastic material. The plastic material is thus joined by means of mechanical oscillations.

Other methods for producing a tension-proof connection are also possible, e.g. by means of clamps or by gluing. It would principally be possible to provide the inner surface of the initial section 3 of the new film tube 2 with an adhesive material and to place the end section 4 of the old film tube 5 over the same. In this case the adhesive material would have to cure in a sufficiently quick manner, which is not the case in currently available adhesives.

Figure 11A:
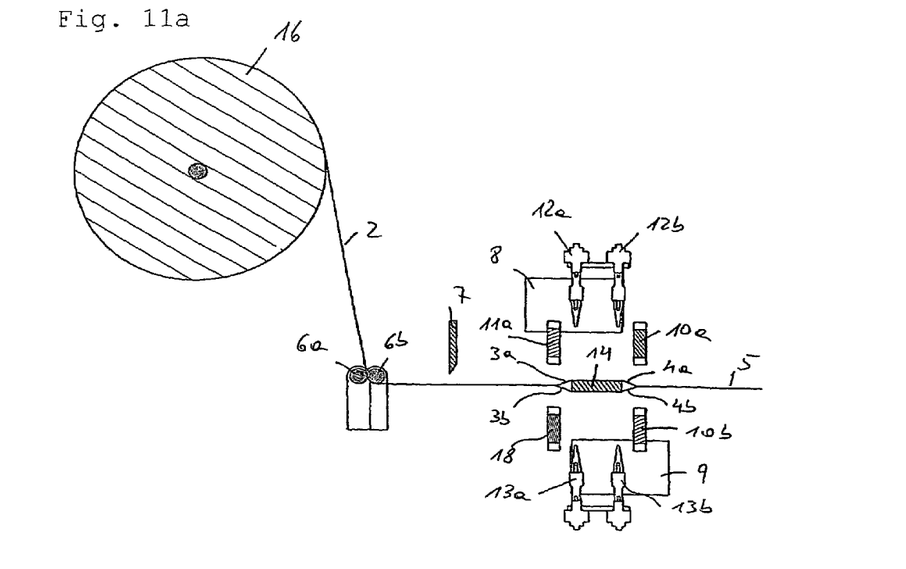
FIG. 11a shows a schematic representation according to FIG. 2 for the process step in which the welding apparatus and the pivoting suction means are flipped away from the film tubes.
Figure 11B:
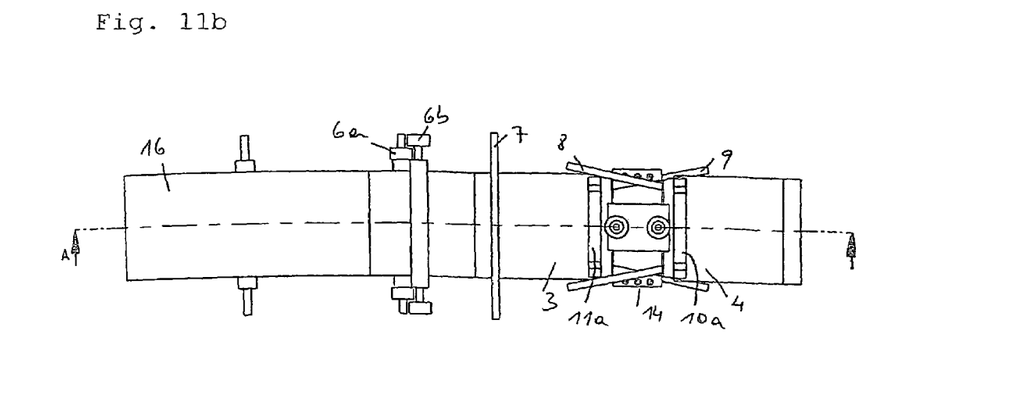
FIG. 11b shows the schematic representation according to FIG. 11a from above.
Figure 12A:
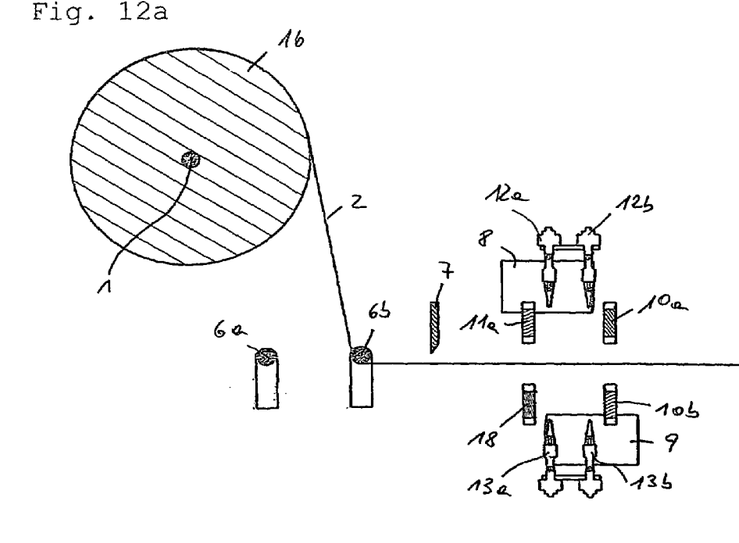
FIG. 12a shows a schematic representation according to FIG. 2 for the process step in which the welding anvil was pulled out on the side and the tension-proof connection between the film tubes to be joined was completed.
Figure 12B:
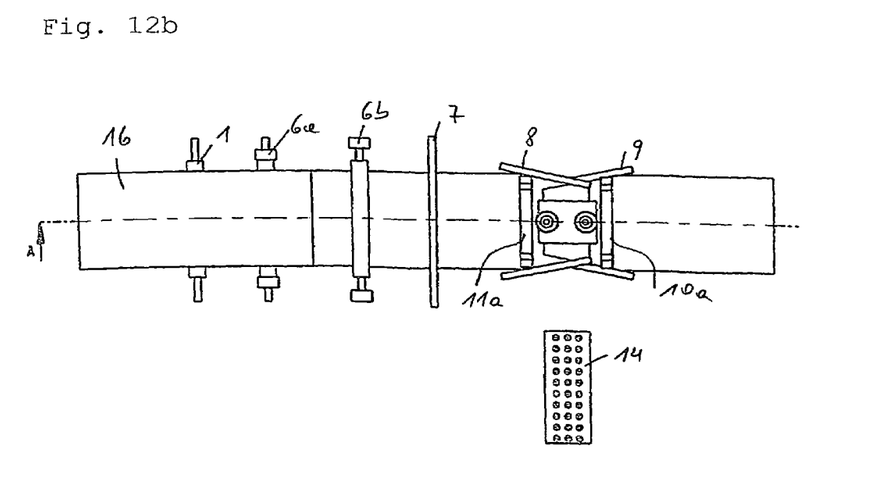
FIG. 12b shows the schematic representation according to FIG. 12a from above.

After completing the welding process, the sonotrodes 12a, 12b, 13a, 13b can be withdrawn according to FIG. 11 and the pivoting suction means 10a and 10b can be flipped away. As a last process step, the welding anvil 14 can be withdrawn laterally, by which the joining point 17 is released. Although this joining point 17 has a triangular cut-out in each of its boundary regions and is thus not sealed, it is still a tension-proof connection. The two joined film tubes 2 and 5 can be guided smoothly through the further sections in the system.

The method in accordance with the invention ensures in particular that a tube is produced again after the joining of the two film tubes 2 and 5. The method in accordance with the invention also allows a precise welding of the two film tubes 2 and 5, which is decisive for avoiding skewing of the joined film tube. The film tube 2, 5 per se shows relative high tolerances which can be compensated by the method in accordance with the invention, however. The method in accordance with the invention can be used in systems with a flying mandrel 25 and in systems with a wedge 28 or vacuum suctions means 27.

Longer standstill periods during a change of the tube roll can thus be prevented with the help of the method in accordance with the invention.

The invention claimed is:

1. A method for joining an initial section of a non vertically orientated film tube which is wound up in a band-like manner on a reel with an end section of a second non vertically orientated film tube extending over subsequent processing stations in an at least partly band like manner comprising:
cutting the initial and end sections of the two film tubes to form longitudinally separate tabs in each of the films;
folding the separate tabs of the two film tubes out of the planes of the films;
moving the folded tabs of the initial and end sections above one another and back onto the plane of the films to overlap each other with the lower face of the tab on one film engaging the upper face of the tab on the other film; and
joining the overlapped tabs in a tension-proof way with each other.

2. A method according to claim 1, wherein the placing of the cut occurs in such a way that the two initial and end sections (3, 4) to be joined are each cut off transversally to the longitudinal extension (L) of the film tubes (2, 5) and the corner regions (15) of the initial and end sections (3, 4) thus produced are cut off at an acute angle relative to the longitudinal extension (L) of the film tubes (2, 5), so that two tabs (3a, 3b, 4a, 4b) each are produced at the initial and end sections (3, 4) to be joined which taper at the end side.

3. A method according to claim 2, wherein the placement of the cut occurs transversally to the longitudinal extension (L) of the film tubes (2, 5) at a right angle to the longitudinal extension (L), so that the tabs (3a, 3b, 4a, 4b) taper in a trapezoid manner in the initial and end sections (3, 4) of the two film tubes (2, 5).

4. A method according to claim 1, wherein the tension-proof connection of the initial and end sections (3, 4) of the film tubes (2, 5) is formed by welding.

5. A method according to claim 4, wherein the welding occurs by means of ultrasonic sound.

6. A method according to claim 1, wherein the tabs (3a, 3b, 4a, 4b) of the joined initial and end sections (3, 4) of the film tubes (2, 5) are sucked up and pivoted by means of negative pressure.

7. A method according to claim 3, wherein for welding the initial and end sections (3, 4) of the film tubes (2, 5) a tab (3a 3b) of the initial section (3) is placed on a welding anvil (14) and is sucked up by the same by means of negative pressure, and a tab (4a, 4b) of the end section (4) is placed on the tab (3a, 3b) situated on the welding anvil (14) and is welded together with the same.

* * * * *